United States Patent [19]

Bachmann

[11] Patent Number: 5,244,076
[45] Date of Patent: Sep. 14, 1993

[54] APPARATUS FOR TRANSPORTING A COMMODITY CONTAINED IN A SUPPLY CONTAINER IN A PRE-DETERMINED DIRECTION

[76] Inventor: Marco Bachmann, Restelbergstrasse 53, 8044 Zürich, Switzerland

[21] Appl. No.: 916,146
[22] PCT Filed: Dec. 10, 1991
[86] PCT No.: PCT/CH91/00257
 § 371 Date: Dec. 10, 1991
 § 102(e) Date: Jul. 31, 1992
[87] PCT Pub. No.: WO92/10416
 PCT Pub. Date: Jun. 25, 1992

[30] Foreign Application Priority Data

Dec. 12, 1990 [DE] Fed. Rep. of Germany ....... 4039678

[51] Int. Cl.$^5$ ............................................. B65G 47/12
[52] U.S. Cl. ................................... 198/443; 198/533; 198/550.01
[58] Field of Search ............ 198/443, 454, 533, 550.4, 198/550.01, 526; 221/203, 204, 205, 201, 258

[56] References Cited

U.S. PATENT DOCUMENTS 2,393,334  1/1946  Mobley et al.
3,202,263  8/1965  Stuller et al. ................... 198/443
4,173,277  11/1979  Zimmerman ................... 198/443

FOREIGN PATENT DOCUMENTS 1036752  8/1958  Fed. Rep. of Germany ...... 198/533
1039939  9/1958  Fed. Rep. of Germany .
0053923  3/1989  Japan ................................ 198/533
0642245  1/1979  U.S.S.R. ........................... 198/533

Primary Examiner—D. Glenn Dayoan
Attorney, Agent, or Firm—Watson, Cole, Grindle & Watson

[57] ABSTRACT

A supply container holds a large amount of citrus fruits from which juice is to be pressed out which fruits are to leave one after the other the supply container through an opening. In order to transport the citrus fruits a partial area of the floor surface located in the center of the container of the otherwise inclined rising floor surface is formed by a plurality of parallel rollers located side by side. All have a non-circular cross-section with a circumferential shape composed of three convexly domed circumferential sections and are driven in the same sense of rotation and the same angular position, such that citrus fruits which rest on the rollers are transported in a direction towards the exit opening. Because the citrus fruits located in a plurality of layers in the supply container are apt to form a bridge due to the consistence of their surfaces the entire amount of citrus fruits positioned in the container is additionally kept moving by pistons which move up and down between the fruits, which pistons project upwards through the inclined rising floor surface adjacent the row of rollers. At both sides of the row of rollers three pistons are respectively mounted to a rail extending under the bottom floor. The two rails are interconnected at one of their ends by a pivot axis. Rotating cams which are positioned under the rails and on an axis of one of the driven rollers cause the up and down movement of the rails and the pistons.

6 Claims, 2 Drawing Sheets

APPARATUS FOR TRANSPORTING A COMMODITY CONTAINED IN A SUPPLY CONTAINER IN A PRE-DETERMINED DIRECTION

BACKGROUND OF THE INVENTION

1. Field of the Invention

The present invention relates to an apparatus for transporting a commodity, specifically citrus fruits contained in a container, in a predetermined, substantially horizontal direction, which container includes a container floor and container walls.

2. Description of the Prior Art

Such a container is known in a connection with an apparatus for squeezing the juice out of fruits. A supply container is thereby located on top of the apparatus and is adapted for receipt of a large amount of citrus fruits which are to be supplied automatically to the juice producing apparatus until the container is completely empty. This known container is provided with stair like staggered floor sections from which the fruits are to roll towards an area ahead of the discharge opening and, furthermore, a lever arm is positioned additionally in this area which periodically pushes the fruits from below and is intended to keep the fruits moving in the area ahead of the discharge opening.

The effect of the measures taken in these known supply containers are, however, unsatisfactory because the citrus fruits located in the supply container in a pile over each other form quite easyly bridges and do not roll any further because they get clamped together, specifically when their rinds have been waxed, such that the juice producing apparatus does no longer receive fruits and an operator must manually correct the interruption of the supply.

SUMMARY OF THE INVENTION

It is, therefore, a general object of the invention to provide an apparatus which guarantees the continuous transporting of a commodity which is prone to a forming of a bridge, specifically citrus fruits, in a predetermined direction for an individual discharging of a respective single article through a discharge opening.

A further object is to provide an apparatus comprising a plurality of rollers positioned closely adjacent of each other and located at a longitudinal center area of the container floor which rises obliquely relative to the container walls, which rollers have equal cross-sectional shapes in form of a regular polygon having a noncircular form set by curvilinear surfaces of the rollers and which rollers are adapted to be driven in the same sense and same angular position in order to transport the commodity resting on the rollers further in the direction of rotation of the rollers; and comprising a plurality of pistons of which a respective number are arranged at both sides of the row of rollers and at distances between the individual pistons, which pistons are adapted to be moved upwards and downwards to move the commodity in order to prevent the forming of bridges.

Due to the rollers having a non-circular cross-section the fruits are kept moving and are transported further specifically in a direction corresponding to the direction of rotation of the rollers. Pistons are preferably present at both sides of the rollers which are placed in line, which pistons can be moved upwards and downwards and which push into the pile of citrus fruits through the inclined container bottom surface and keep the fruits moving continuously.

BRIEF DESCRIPTION OF THE DRAWINGS

The invention will be better understood and objects other than those set forth above, will became apparent when consideration is given to the following detailed description thereof. Such description makes reference to the annexed drawings wherein.

DETAILED DESCRIPTION OF THE PREFERRED EMBODIMENTS

Figure 1:
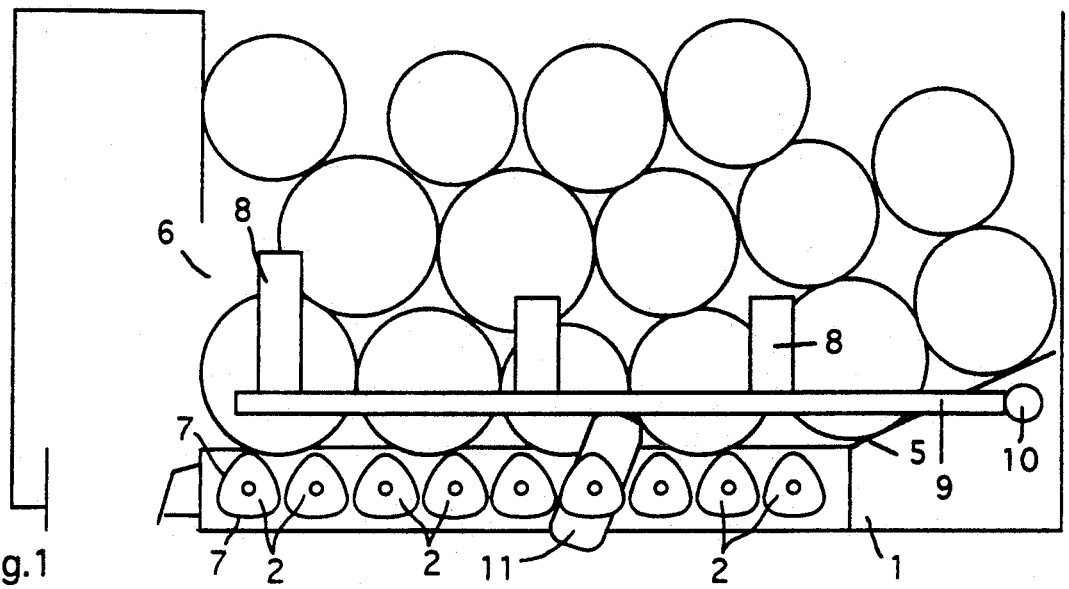
FIG. 1 illustrates the principle of the conveyor apparatus in a container, in a schematic side view.
Figure 2:
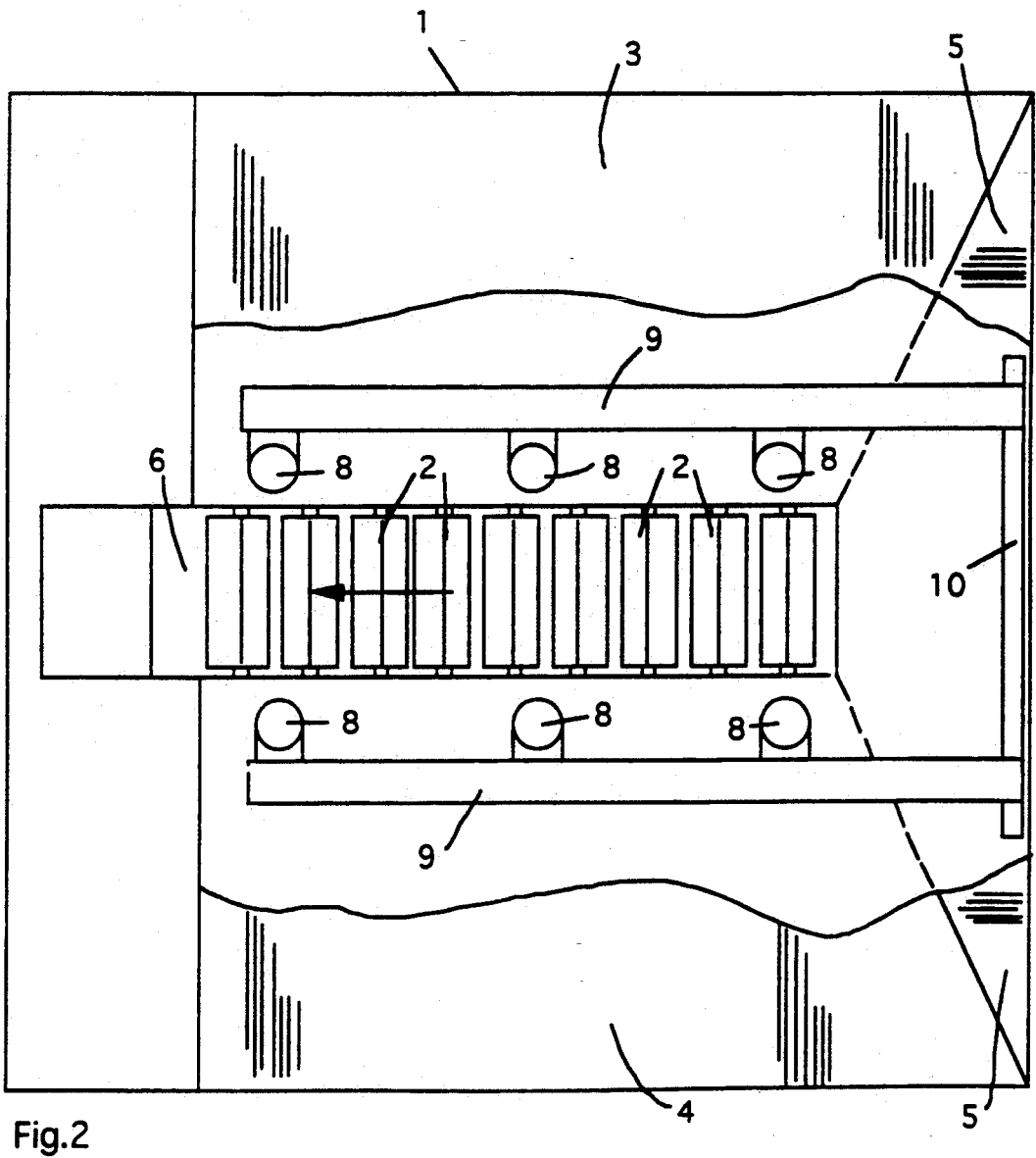
FIG. 2 is a top view of the apparatus in a container.

A part of the floor area in a container 1 is formed at the longitudinal center area by a plurality of rollers 2 placed subsequently in a row and which are driven to rotate in the same sense of rotation in accordance with the arrows in FIG. 1, for instance by not specifically illustrated gear wheels on the axes of the rollers 2 and idler gears. The rest of the container floor consists of floor surface sections 3 and 4 which rise inclined towards the walls of the container at opposite sides of the row of rollers, and of a further floor surface section 5 which extends inclined from two corners of the container towards the first roller 2. The container 1 includes behind the last roller 2 an opening 6 in the vertical wall through which a respective citrus fruit falls downwards into a not illustrated apparatus for extracting the juice of the fruit located under the supply container 1. The movement of the fruits in a direction towards the opening 6 is caused by the rotating of all rollers 2 in the same sense of rotation corresponding to the arrows in FIG. 1. In order to transport the fruits in said direction all rollers 2 have a non-circular cross-section with surface sections having in the direction of the circumference a alternatingly different radial distance. In the illustrated example the rollers 2 have a cross-section having a cross-sectional shape composed of three convexly domed circumference sections.

Because the supply container 1 contains a large amount of fruits above each other in a plurality of layers and the fruits tend to form bridges, specifically when the rinds of the fruits are waxed and thus are still more inclined to adhere onto each other it is possible that the movement caused by the non-circular rollers 2 is not enough for a prevention of the forming of a bridge. In order to keep the fruits located in the container 1 continuously in motion, pistons 8 are positioned at distances from each other at both sides of the row of the rollers 2 which pistons 8 move upwards and downwards between the fruits such that they must continuously change their position. In the illustrated embodiment three pistons 8 are mounted at either side onto a rail 9 and the two parallel rails 9 extending under the inclined container floor are pivotable around a pivot axis 10 inter-connecting the rails 9 at one end thereof. Under each rail 9 a rotating cam 11 (FIG. 1) is mounted on an axis of one of the rollers 2 which causes the uniform upwards and downwards movement of the piston 8.

Figure 3:
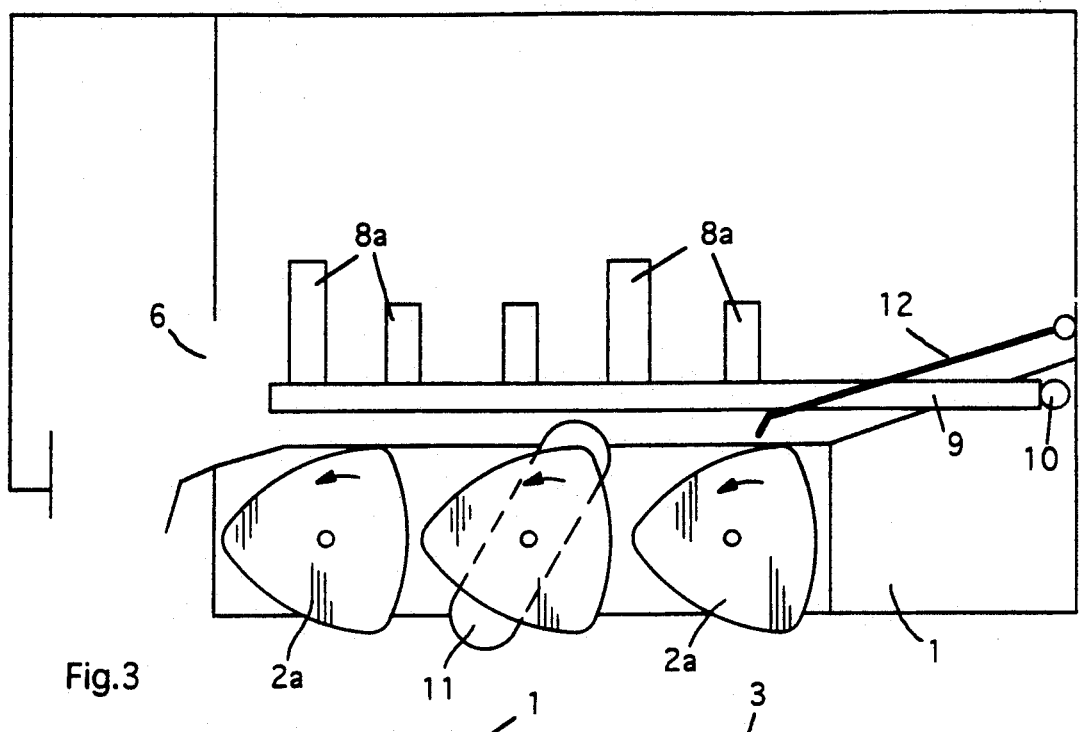
FIGS. 3 and 4a modified embodiments of the apparatus in a schematic side view and top view.
Figure 4:
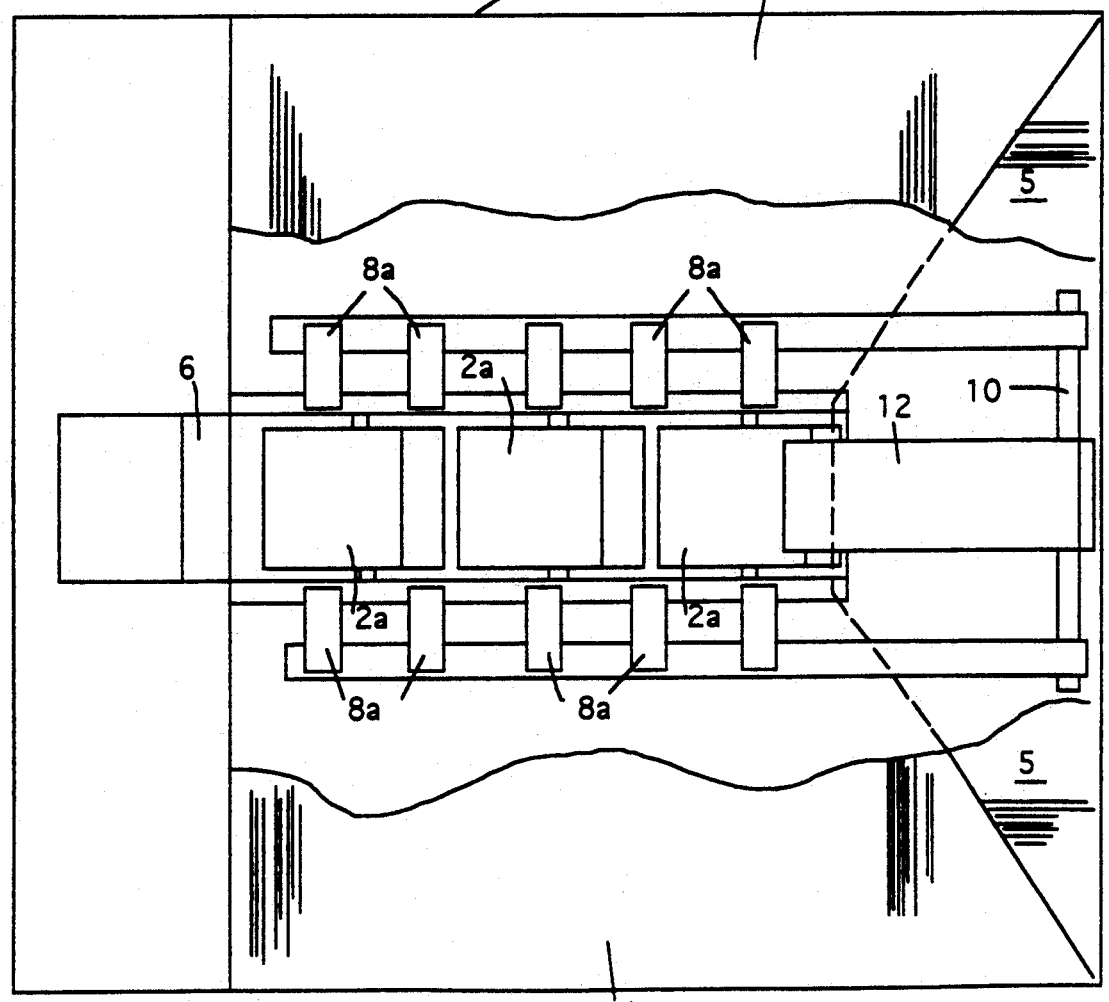

In the modified embodiment according to FIGS. 3 and 4 a part of the floor area of the container 1 is formed by three rollers 2a arranged in series and which are considerably larger than the rollers of the first embodiment and forward the citrus fruits more effectively in one direction. Also, the pistons 8a positioned at both sides of the rollers on rails 9 and which are moveable upwards and downwards are considerably broader than the cylinder shaped pistons of the first embodiment and are of irregular heights along the row of their subsequent positions and move up and down at one side of the row of rollers twice as often as at the opposite side which can be produced by different shapes of two cams 11, e.g. as single cam or as twin cam on a respective roller axis in a simple manner. The rails 9 are hereby separately pivotable around the axis 10. All these measures are to prevent the forming of bridges in the container which is filled by fruits. A sheet metal plate 12 is also used for this task, which plate 12 is pivotally mounted above the pivot axis 10 to the wall of the container, which plate 12 rests at its other end on the last roller 2a and is pivoted up and down by the rotation of the non-circular roller such that the fruits are also kept moving in the area of the inclined rising floor surface secton 5.

While there are shown and described present preferred embodiments of the invention, it is to be distinctly understood that the invention is not limited thereto, but may be otherwise variously embodied and practiced within the scope of the following claims.

I claim:

1. An apparatus for transporting a commodity, specifically citrus fruits contained in a container in a predetermined, substantially horizontal direction, which container includes a container floor and container walls;

comprising a plurality of rollers positioned closely adjacent of each other and located at a longitudinal center area of the container floor which rises obliquely relative to the container walls, which rollers have equal cross-sectional shapes in form of a regular polygon having a non-circular form set by curvilinear surfaces of the rollers and which rollers are adapted to be driven in the same sense and same angular position in order to transport the commodity resting on the rollers further in the direction of rotation of the rollers; and comprising a plurality of pistons of which a respective number is arranged at both sides of the row of the rollers and at distances between the individual pistons, which pistons are adapted to be moved upwards and downwards to move the commodity in order to prevent the forming of bridges.

2. The apparatus of claim 1, in which the rollers comprise a cross-section having a circumferential shape composed of three convexly curved circumference sections.

3. The apparatus of claim 1, in which the supply container comprises a discharge opening in the container wall which follows seen in the direction of transport the last roller for allowing a discharge of one single article of the commodity at a time.

4. The apparatus of claim 1, in which the respective pistons arranged at a respective side of the row of rollers are commonly positioned at a rail, and in which the accordingly two rails are pivotable around a pivot axis which interconnects the rails at one end thereof, and are adapted to be moved up and down by means of a respective cam positioned under a rail and rotationally driven by one of the axes of the rollers.

5. The apparatus of claim 1, in which the pistons at the one side and the other side of the row of rollers move up and down with a different timing, preferably in a relation of 1:2.

6. The apparatus of claim 5, in which the pistons are respective blocks positioned upstanding on the rail and having various heights.

* * * * *